United States Patent Office 3,560,343
Patented Feb. 2, 1971

3,560,343
LOW D.E. STARCH CONVERSION PRODUCTS
Frederick C. Armbruster, La Grange, and Clarence F. Harjes, Hinsdale, Ill., assignors to CPC International Inc., New York, N.Y., a corporation of Delaware
No Drawing. Filed Mar. 24, 1967, Ser. No. 625,584
Int. Cl. C12d 13/02
U.S. Cl. 195—31
9 Claims

ABSTRACT OF THE DISCLOSURE

The present invention provides a process for preparing low D.E. startch hydrolysates and low D.E. starch conversion syrup products which are both liquid and solid. Starch is treated with acid to a D.E. less than 15 and then conveted with a bacterial alpha-amylase to a D.E. between 10 and 25. From the resulting hydrolysate product is obtained a non-having syrup which is almost completely water-soluble.

---

The present invention relates to a process for preparing low D.E. starch hydrolysates and low D.E. starch conversion syrups. The present invention also relates to the resulting products. D.E. is an abbreviation for dextrose equivalent which is a common expression in the art for describing the total reducing sugars content of a material calculated as dextrose, and expressed as percent dry basis.

Conventionally, low D.E. starch conversion syrups have been produced by the hydrolysis of starch with acids. The primary emphasis in the preparation of commercial starch hydrolysate syrups has been on attaining stability, clarity and non-crystallizing characteristics.

There is a large potential market for syrups and syrup solids with bland taste, low sweetness and low hygroscopicity at a low D.E. level. Such syrups, hydrolysates and syrup solids are useful as basis for the preparation of food items as well as for bodying agents and as additives having non-sweet, water holding, non-hygroscopic characteristics. Other applications include use as a carrier for synthetic sweeteners, as a flavor enhancer, as an additive for coloring agents, as a spray drying adjunct for coffee extracts or tea extracts, as a bulking, bodying, or dispersing agent in synthetic creams or coffee whiteners, as a moisture holding agent in breads, pastries, meats and as a bodying and smoothing agent in puddings, soaps, and frozen iced desserts.

Low D.E. syrups having a D.E. less than 28 to 30 are not practical to produce from starches by the process of the prior art. Previous attempts to produce low D.E. syrups from starches by prior art processes have failed by way of extremely poor filtration rates, yield losses and substantial insolubility of syrup solids.

One object of the present invention is to provide a novel low D.E. starch hydrolysate product.

Another object of the present invention is to provide a low D.E. syrup that is clear and stable.

A further object of the present invention is to provide a bland tasting, low sweetness, non-hygroscopic, low D.E. starch hydrolysate product.

Still another object of the present invention is to provide a syrup solids product with improved characteristics with respect to hygroscopicity and water-solubility.

Another object of the present invention is to provide syrups and syrup solids for use in food products, the syrup products having a minimum effect on flavors while providing bulk, viscosity, body, and stability to the food products.

A related object of the invention is to provide new practical processes for the manufacture of syrups and syrup solids and starch hydrolysate products of the character described.

A similar object of the invention is to provide new practical processes for the manufacture of starch hydrolysates that may be clarified and will remain clear at high solids concentration.

Other objects of the present invention will be apparent hereinafter from the following description and from the recitals of the appended claims.

The present invention provides a process for preparing a novel low D.E. starch hydrolysate. This process comprises subjecting a mixture of starch and water, having a solids content of less than about 50%, to the hydrolytic action of acid to obtain a starch hydrolysate having a D.E. between about 5 and about 15, subjecting the acid hydrolysate to the hydrolytic action of bacterial alpha-amylase to a D.E. between about 10 and about 25, the increase in D.E. being at least about 5, to produce a starch hydrolysate having a dextrose content of less than 4%, and that is also characterized by having a sum of the percentages of saccharides therein, dry basis, having a degree of polymerization of 1 to 6, divided by the D.E., provide a ratio greater than about 2.0. This ratio is referred to hereinafter as the characteristic or descriptive ratio.

The present invention also provides a process for preparing a novel low D.E. syrup by the concentration of the starch hydrolysate produced in accordance with this invention, to produce a syrup having a solids content greater than 50%. The syrup, i.e. concentrated hydrolysate, may or may not be refined by conventional means.

The present invention also provides a process for preparing syrup solids by reducing the moisture content of either a starch hydrolysate or a syrup produced in accordance with this invention to a moisture content of less than 15%.

It has been discovered that syrup and starch hydrolysate products may be obtained from starches by application in sequence of acid to the starch to yield a starch hydrolysate having a D.E. between about 5 and about 15 and subsequently applying a hydrolytic enzyme to the acid starch hydrolysate to yield a starch hydrolysate having a D.E. between about 10 and about 25 and having a descriptive ratio of at least about 2.0.

One preferred method of practicing the present invention involves the steps of slurrying corn starch in water to a density between 5° and 30° Baumé, adjusting the pH of the slurry to between 1 and 3 and raising the temperature of the starch slurry to between 70° C. and 160° C. to solubilize and hydrolyze the starch to a D.E. between 5 and 15. The pH is adjusted to between 6 and 8 and the hydrolysate is dosed with bacterial alpha-amylase. The mixture is then hydrolyzed under the proper conditions to a D.E. between 10 and 25, preferably between about 15 and about 25 when it is desired that the final product be a haze-free syrup. The enzyme conversion step is carried out at a temperature in the range between about 50° and about 95° C. The mixture is held at the conversion temperature for a period of time ranging from a few minutes to as long as 1 or 2 hours or perhaps more.

The resulting hydrolysate may be concentrated and/or refined by conventional procedures to yield a stable corn syrup, which is substantially haze-free and highly soluble in water. The syrup may be spray dried to yield corn syrup solids with low hygroscopicity and high water solubility.

Suitable starches include cereal starches such as corn, grain sorghum and wheat, waxy starches such as, waxy milo and waxy maize, and root starches, such as potato starch and tapioca starch.

The initial step, i.e. mild acid hydrolysis of starch, places the starch in proper condition for further hydrolysis by the hydrolytic enzyme. In order for acid hydrolysis to take place, it is necessary that starch solubilization be effected either simultaneously with acid treatment or prior to acid treatment. Starch solubilization may be accomplished, for example, by heating the starch water slurry above the gelatinization temperature of the starch or by adding dry starch to heated water or by other similar means. Similarly, the acid may be added to the starch before, during or after the starch is gelatinized.

Acid hydrolysis is carried out at a pH less than 4, preferably between about 1 and about 3 at a temperature sufficiently high to gelatinize the starch. The hydrolysis is continued to a D.E. of at least 5 and less than 16.

The acid hydrolysate is then neutralized and subjected to further conversion with a suitable enzyme preparation to increase the reducing sugar content by at least 5 D.E.

The pH of the enzyme conversion medium is preferably that which is suitable for the optimum activity of the bacterial alpha-amylase. Generally, this pH range is between about 6 and about 8. The most suitable temperature range lies between that required for gelatinizing starch which is at least 60° C. and that at which the enzyme will lose a large portion of its activity, which is about 95° C. It has been found that the preferred temperature range is between about 80° C. and about 92° C.

The preferred enzyme used for the conversion of the acid hydrolysate to low D.E. hydrolysates in accordance with the present invention is the type commonly referred to in the art as bacterial alpha-amylase. It is a starch liquefying, heat resistant, hydrolytic alpha-amylase. Suitable bacterial alpha-amylase may be produced by certain strains of *Bacillus subtilis, Bacillus mesentericus* and the like by conventional fermentation methods. HT–1000, the proprietary name of a bacterial alpha-amylase preparation produced and marketed by Miles Chemical Laboratories, is an example of an enzyme preparation that is suitable for use in the present invention. Other suitable bacterial alpha-amylase include Rhozyme, H39, manufactured and sold by Rohm & Haas, CPR–8 manufactured and sold by the Wallerstein Division of Baxter Laboratories, Inc.

The time required for the solubilization and acid hydrolysis step depends upon the amount of acid used and the reaction temperature. The more acid used and the higher the temperature, the less time required for the reaction. The same is true for the enzyme hydrolysis relative to the amount of enzyme employed and the reaction temperature selected. Optimum conditions for hydrolysis of starch with bacterial alpha-amylase are known.

When the desired D.E. is reached, conversion action may be stopped by adjusting the pH to 4.5 or below or by heating the conversion mixture to a temperature above the inactivation temperature of the enzyme, or the conversion may be effected at temperatures sufficiently high that the enzyme has been substantially inactivated by the time the final D.E. is reached.

It is desirable to operate at relatively high dry substance levels up to about 50% and preferably in the range of between about 20% and about 40%, i.e. about 10° to about 20° Baumé. When operating at a high dry substance level, the required tank volume for conversion is reduced as are evaporation costs. However, the process is suitably operated at dry substance concentration outside of this range.

The acid hydrolysis and saccharifying conditions may be varied within certain limits dictated by the stability and activity characteristics of the enzyme and the gelatinization and acid hydrolysis properties of the starch.

After termination of the enzyme conversion, the resulting starch hydrolysate has a solids content less than 50%. It may be used in unaltered form as a desirable product for the uses suggested heretofore. In addition, the starch hydrolysate may be concentrated and/or refined to yield a syrup having a solids content greater than 50%. Generally, industry prefers use of a syrup of high solids content both because it is advantageous in shipping and in applications.

The syrup may be dried by conventional means to yield syrup solids high in water solubility and stability as well as low in hygroscopicity.

The refining of the hydrolysate is achieved by conventional refining methods. These include treating with vegetable carbon, ion exchange resins, filtration, centrifugation and the like.

The invention will now be further described in detail by means of several exemplary demonstrations thereof.

EXAMPLE I

Several samples of corn starch (A, B and C) were slurried in water providing slurries having Baumés ranging from 14° to 22°. These slurries were partially acid hydrolyzed to a maximum of 15 D.E. The particular D.E. achieved by acid hydrolysis in each of the samples is set forth in Table I below. After acid hydrolysis, the slurry was neutralized to a pH between 6 and 7. The neutralized liquor was cooled to between 80 and 85° C., and dosed with bacterial alpha-amylase (HT–1000) in the quantity set forth below. A final D.E. of 19 to 21 was obtained in each of the samples in a period of time between 1 and 3 hours. The final conversion liquors are low in color. These liquors are easily refined and evaporated to about 42° Baumé to provide syrups. Sample D was a conventionally acid hydrolyzed starch conversion product. Acid hydrolysis was carried out to reach a D.E. of 20. Tables I and II below set forth the reaction conditions for conversion and the product analyses respectively.

TABLE I.—ENZYME CONVERSION CONDITIONS

| Sample | D.E. of acid hydrolysate | Percent dry substance | Temp., °C. | pH | Enzyme dose | Time, hours | Final D.E. |
|---|---|---|---|---|---|---|---|
| A | 15.2 | 38 | 80 | 6.5 | 0.01 | 1 | 19.7 |
| B | 12.9 | 37.5 | 85 | 6.5 | 0.05 | 2 | 20.2 |
| C | 10.3 | 38.1 | 85 | 6.5 | 0.1 | 2 | 21.8 |
| D | 20 | | | | | | |

TABLE II.—PRODUCT ANALYSES

| Sample | Final D.E. | Percent dry substance | $DP_1$ | $DP_2$ | $DP_3$ | $DP_4$ | $DP_5$ | $DP_6$ | $DP_{7+}$ | Descriptive ratio |
|---|---|---|---|---|---|---|---|---|---|---|
| A | 19.7 | 72 | 3.9 | 5.8 | 8.2 | 7.2 | 7.3 | 10.2 | 57.4 | 2.1 |
| B | 20.2 | 72 | 2.3 | 5.9 | 8.5 | 6.4 | 6.6 | 12.6 | 57.7 | 2.1 |
| C | 21.8 | 75 | 2.3 | 8.3 | 10.9 | 8.1 | 9.2 | 16.9 | 44.3 | 2.5 |
| D | 20.0 | | 5.5 | 5.9 | 5.8 | 5.8 | 5.5 | 4.3 | 67.2 | 1.6 |

The descriptive ratios of each of samples A–C were greater than 2. The descriptive ratio of sample D (conventional acid hydrolysate) was 1.6.

After refining, typical analyses of the syrups were as follows: substantially colorless, clarity greater than 90%, sulfated ash 0.42% dry basis, protein 0.03% dry basis. The refined syrups were allowed to stand at room temperature and at the end of a one month period remained haze-free.

EXAMPLE II

Waxy milo starch was slurried in water to a Baumé of about 20°. The slurry was then partially hydrolyzed by acid to a D.E. of about 6.5 and then neutralized to a pH between 6 and 7. The acid hydrolyzed product was then dosed with bacterial alpha-amylase (HT–1000) in the amount of 0.02%. The temperature of the dosed liquor was between 80 and 85° C. Conversion was allowed to proceed for about 1½ hours until a D.E. of about 21 was obtained. Analysis of the product obtained appears in Table III below.

TABLE III

Sample G

| | |
|---|---|
| Final D.E. | 21.4 |
| Dry substance percent | 75 |
| $DP_1$ | 2.3 |
| $DP_2$ | 5.9 |
| $DP_3$ | 8.4 |
| $DP_4$ | 7.3 |
| $DP_5$ | 8.0 |
| $DP_6$ | 11.3 |
| $DP_{7+}$ | 56.8 |

It may be noted that in Examples I and II the descriptive ratio exceeds 2.0, i.e. the sum of the percentages of degree of polymerization from 1 to 6 divided by the D.E. provides a ratio in excess of 2. If the descriptive ratio is at least about 2, the product is highly water-soluble and exhibits almost no haze formation. If the descriptive ratio of syrups in the range of 15–25 D.E. is substantially below 2, e.g. 1.6 or less, the products exhibit haze formation and are less water-soluble than products with a ratio of at least 2.

EXAMPLE III

Tapioca starch was slurried in water to a Baumé of about 20°. The slurry was then partially hydrolyzed by acid to a D.E. of about 8, and then neutralized to a pH between about 6 and 7. The acid hydrolyzed product was then dosed with bacterial alpha-amylase (HT–1000) in a small quantity of about 0.02%. The temperature of the dosed liquor was raised to between 80 and 85° C. and conversion was allowed to proceed for a period of time sufficient to achieve a D.E. of about 20. Analysis of the product obtained appears in Table IV below.

TABLE IV

Sample H

| | |
|---|---|
| Final D.E. | 18.1 |
| Dry substance percent | 75 |
| $DP_1$ | 2.5 |
| $DP_2$ | 5.0 |
| $DP_3$ | 7.5 |
| $DP_4$ | 7.4 |
| $DP_5$ | 7.5 |
| $DP_6$ | 10.5 |
| $DP_{7+}$ | 59.6 |

EXAMPLE IV

A water slurry of waxy maize starch was prepared to about 20° Baumé. The slurry was acid hydrolyzed to a D.E. of 5. The acid hydrolysate was neutralized to a pH between 6 and 7 and a small quantity of bacterial alpha-amylase (HT–1000) was added (about 0.01%). Hydrolysis was carried out under the temperature and time conditions discussed above to reach a D.E. of 10, at which time hydrolysis was terminated.

The hydrolysate product was concentrated and refined to obtain a syrup. The syrup was then spray dried to obtain syrup solids having a moisture content of about 4%. The syrup solids were substantially completely water soluble.

The product analyses appear in Table V below.

TABLE V

Sample J

| | |
|---|---|
| Final D.E. | 10 |
| $DP_1$ | 1.4 |
| $DP_2$ | 2.4 |
| $DP_3$ | 4.0 |
| $DP_4$ | 3.4 |
| $DP_5$ | 3.0 |
| $DP_6$ | 6.0 |
| $DP_{7+}$ | 79.8 |

Haze development in starch conversion syrups will vary considerably in prior art low D.E. hydrolysates depending upon the temperature at which the hydrolysates are held, the solids concentration, and the degree of hydrolysis as reflected by the D.E. value, as well as other facts. In extreme cases, the hydrolysate can become completely opaque, or even set up to a solid or pasty mass. In less extreme cases, haze particles may be found to agglomerate and settle toward the bottom of the liquor resembling sludge. In lesser instances, haze particles appear too fine and too dispersed to agglomerate to a marked degree. They therefore remain in suspension lending the hydrolysate a cloudy appearance. In each of these cases, the optical clarity of the liquors is adversely effected.

Haze formation may therefore conveniently be determined by measuring the amount of light passing through a sample of the hydrolysate as compared to that passing through a blank of distilled water. This is used as a test for determining the clarity and solubility of hydrolysates prepared in accordance with the invention. The hydrolysates of the examples in the invention were concentrated to 65% solids, held for 3 days at 5° C., and examined spectrophotometrically by measuring the light transmittance percent at 600 mμ through 4 centimeter cells, each containing portions of the hydrolysates respectively which had first been held three days at 5° C. The relative stability of low D.E. hydrolysates prepared by the acid-enzyme sequence taught in the present invention is indicated by the very high light transmittance values observed. These are presented in the following table.

TABLE VI.—PERCENT LIGHT TRANSMITTANCE

| D.E. value | Acid hydrolysis corn starch | Waxy milo starch | Tapioca starch | Acid conv. corn |
|---|---|---|---|---|
| 15 | 92 | 93 | 66 | 0 |
| 20 | 96 | 93 | 68 | 1 |
| 25 | 96 | 94 | 70 | 6 |

In contrast, hydrolysates prepared by acid hydrolysis alone either failed to furnish clear haze-free hydrolysates because they could not be filtered in any appreciable rate after conversion, particularly from the low D.E. range or after filtration was achieved, or the clarified hydrolysates soon exhibited haze formation, often becoming completely opaque by exhibiting 0% light transmittance within three days at 5° C.

The hydrolysate product of the present invention may be concentrated and/or refined to produce syrups or syrup solids. If the D.E. of the hydrolysate is substantially below 15, e.g. 10, the syrup products obtained will exhibit some haze formation. It is therefore advantgaeous to produce syrup solids from starch hydrolysates having a D.E. substantially below 15. The syrup solids are obtained by reducing the moisture content of the syrup to less than 15%, preferably about 4%. The syrup solids exhibit 100° water solubility, the solution being completely free of haze if the D.E. is 15–25.

The descriptive ratio $$[DP_{1 \rightarrow 3}/D.E.]$$

is a convenient method for the determining of the characteristics of the hydrolysate or syrup. If the descriptive ratio is at least about 2, the product is highly water soluble and exhibits almost no haze formation. If the descriptive ratio is substantially below 2, e.g. 1.6 or less, the products exhibit haze formation and are less water soluble than products with a ratio of at least 2.

The hydrolysates of this invention, whether in the form of dilute or concentrated syrups, or in the form of dry solids, are characterized by blandness of taste and low sweetness and they are non-hygroscopic. They are fully and readily soluble in water. When used in food products, they have a minimal effect upon the flavor while providing bulk and stability.

These characteristics make the products of the invention particularly suitable for applications such as, for example, carriers for synthetic sweeteners, flavors, coloring agents and essences; spray drying adjuncts for coffee extracts and tea extracts; bulking, bodying and dispersing agents in synthetic creams or coffee whiteners; ingredients promoting moisture retention in bread, pastries, and meats; and as components of dry soup mixes, bakery mixes, frosting mixes, spice mixes, and blends, beverage powders, condiments, gravy mixes, sauce mixes and frozen dairy foods. In addition, they are useful in the formulation of anti-caking agents, tabletting compounds, whipped products, protective coatings, agglomeration aids and low or reduced calorie foods and beverages.

When the starch hydrolysate products or syrups or syrup solids of the invention are used as solutions at a high solids concentration of less than 40% by weight, they are particularly attractive because of their bland flavor, low hygroscopicity, low sweetness, and ready solubility. They impart density and good mouthing characteristics without appreciably affecting viscosity or flavor. At solids concentrations above about 40%, the solutions contribute significantly to the viscosity characteristics of any system in which they are employed.

While the invention has been described in connection with specific embodiments thereof, it will be understood that it is capable of further modifications and this application is intended to cover any variations or adaptations of the invention, following in general, the principles of the invention and including such departures from the present disclosure as come within known or customary practice in the art to which the invention pertains and as may be applied to the essential features hereinbefore set forth and as fall within the scope of the invention and the limits of the appended claims.

We claim:
1. A process for preparing a starch hydrolysate having
   (A) a D.E. between about 10 and about 25 and
   (B) a descriptive ratio being the quotient obtained by dividing the sum of the percentages of saccharide, dry basis, having a degree of polymerization of 1 to 6 by the D.E., which comprises
      (1) subjecting a mixture of starch and water having a solids content of less than about 50% to the hydrolytic action of the acid to attain a D.E. between about 5 and about 15, and
      (2) subjecting the resulting acid hydrolysate to sufficient hydrolytic action of bacteria alpha-amylase to increase the D.E. by at least 5 and to obtain the starch hydrolysate.
2. A process in accordance with claim 1 wherein the starch is corn starch.
3. A process in accordance with claim 1 wherein the starch is a waxy cereal starch.
4. A process in accordance with claim 1 wherein the acid hydrolysis takes place at a pH between about 1 and about 3.
5. A process for preparing a syrup having
   (A) A D.E. between about 10 and about 25.
   (B) a solids content greater than about 50%, and
   (C) a descriptive ratio greater than 2.0, said descriptive ratio being the quotient obtained by dividing the sum of the percentages of saccharides, dry basis, having a degree of polymerization of 1 to 6 by the D.E., which comprises
      (1) subjecting a mixture of starch and water having a solids content less than about 50% to the hydrolytic action of acid to obtain a hydrolysate having a D.E. between about 5 and about 15.
      (2) subjecting the resultant hydrolysate to the hydrolytic action of bacterial alpha-amylase to increase the D.E. by at least 5, and
      (3) concentrating the resulting starch hydrolysate to a solids content greater than 50% thereby obtaining the syrup.
6. A process in accordance with claim 5 wherein the starch is corn starch.
7. A process in accordance with claim 5 wherein the starch is a waxy cereal starch.
8. A process in accordance with claim 5 wherin the pH during acid hydrolysis is between about 1 and about 3.
9. A process for preparing low D.E. dry syrup solids comprising
   (1) preparing a syrup in accordance with the process of claim 5 and then
   (2) reducing the moisture content of said syrup to less than 15%.

References Cited
UNITED STATES PATENTS

| | | | |
|---|---|---|---|
| 2,571,541 | 10/1951 | Cleland et al. | 99—142 |
| 2,965,520 | 12/1960 | Snyder et al. | 195—31X |
| 3,029,192 | 4/1962 | Krebs | 195—17 |
| 3,185,633 | 5/1965 | Krebs | 195—17 |
| 3,197,338 | 7/1965 | Hurst et al. | 195—31 |
| 3,490,922 | 1/1970 | Hurst | 99—142 |

OTHER REFERENCES

Wallerstein Technical Bulletin No. 236 (4 pp.), April 1964.

LIONEL M. SHAPIRO, Primary Examiner

U.S. Cl. X.R.

99—142

UNITED STATES PATENT OFFICE
CERTIFICATE OF CORRECTION

Patent No. 3,560,343    Dated February 2, 1971

Inventor(s) Frederick C. Armbruster et al.

It is certified that error appears in the above-identified patent and that said Letters Patent are hereby corrected as shown below:

Column 6, TABLE VI, second column heading "Acid hydr( corn starch" should read -- Corn Starch --; same table, fift] column heading "Acid conv. corn" should read -- Conventiona: Acid Hydrolyzed Corn Starch --.

Signed and sealed this 16th day of May 1972.

(SEAL)
Attest:

EDWARD M. FLETCHER, JR.             ROBERT GOTTSCHALK
Attesting Officer                   Commissioner of Pate 2 different CO")

UNITED STATES PATENT OFFICE
CERTIFICATE OF CORRECTION

Patent No. 3,560,343   Dated February 2, 1971

Inventor(s) Frederick C. Armbruster et al.

It is certified that error appears in the above-identified patent and that said Letters Patent are hereby corrected as shown below:

Column 1, line 16, "conveted" should read -- converted --; line 18, "non-having" should read -- non-hazing --; line 46, "soaps" should read -- soups --. Column 6, line 18, "facts" should read -- factors --. Claim 1 (B) "a descriptive ration being" should read -- a descriptive ratio greater than 2.0 said descriptive ratio being --.

Signed and sealed this 10th day of October 1972.

(SEAL)
Attest:

EDWARD M. FLETCHER, JR.
Attesting Officer

ROBERT GOTTSCHALK
Commissioner of Patents